United States Patent

Ota et al.

Patent Number: 5,317,512
Date of Patent: May 31, 1994

[54] ACTUATION SYSTEM FOR VEHICLE PASSENGER PROTECTIVE DEVICE

[75] Inventors: Toshiaki Ota, Toyohashi; Yoshihiko Teguri, Okazaki; Masahito Muto, Toyota; Koichi Fujita, Nagoya; Motomi Iyoda, Seto, all of Japan

[73] Assignees: Nippondenso Co., Ltd., Kariya; Toyota Jidosha Kabushiki Kaisha, Toyota, both of Japan

[21] Appl. No.: 872,767

[22] Filed: Apr. 23, 1992

[30] Foreign Application Priority Data

Apr. 23, 1991 [JP] Japan .................. 3-092357
Apr. 23, 1991 [JP] Japan .................. 3-092360

[51] Int. Cl.⁵ .................. B60R 21/32; B60R 21/08
[52] U.S. Cl. .................. 364/424.05; 307/10.1; 280/735; 340/438; 180/271
[58] Field of Search .......... 364/424.05, 426.01; 340/436, 438, 647

[56] References Cited

U.S. PATENT DOCUMENTS

| | | | |
|---|---|---|---|
| 3,762,495 | 10/1973 | Usui et al. | 280/735 |
| 4,836,024 | 6/1989 | Woehrl et al. | 340/436 |
| 4,994,972 | 2/1991 | Diller | 364/424.05 |
| 5,037,129 | 9/1991 | Fritz et al. | 340/436 |
| 5,038,134 | 8/1991 | Kondo et al. | 340/438 |
| 5,083,276 | 1/1992 | Okano et al. | 364/424.05 |
| 5,182,459 | 1/1993 | Okano et al. | 364/424.05 |
| 5,208,484 | 5/1993 | Okano et al. | 340/436 |

FOREIGN PATENT DOCUMENTS 53-16232 2/1978 Japan .

*Primary Examiner*—Thomas G. Black
*Assistant Examiner*—Tyrone V. Walker
*Attorney, Agent, or Firm*—Cushman, Darby & Cushman

[57] ABSTRACT

An arrangement is presented for an actuation system of a passenger protective device for a motor vehicle. The system is equipped with a storage device to successively input a newer acceleration signal from an acceleration sensor at every division period obtained by dividing a measurement period so as to store and update a plurality of the latest acceleration data for the measurement period. The plurality of stored latest acceleration data are summed to obtain an integration value at the measurement period. The system compares this integration value with a predetermined value to detect a collision state of the motor vehicle. When detecting the collision state of the motor vehicle, the system actuates the passenger protective device. This system arrangement can improve the vehicle collision decision accuracy.

6 Claims, 13 Drawing Sheets

G WAVEFORM ON HIGH-SPEED COLLISION

G WAVEFORM ON LOW-SPEED COLLISION

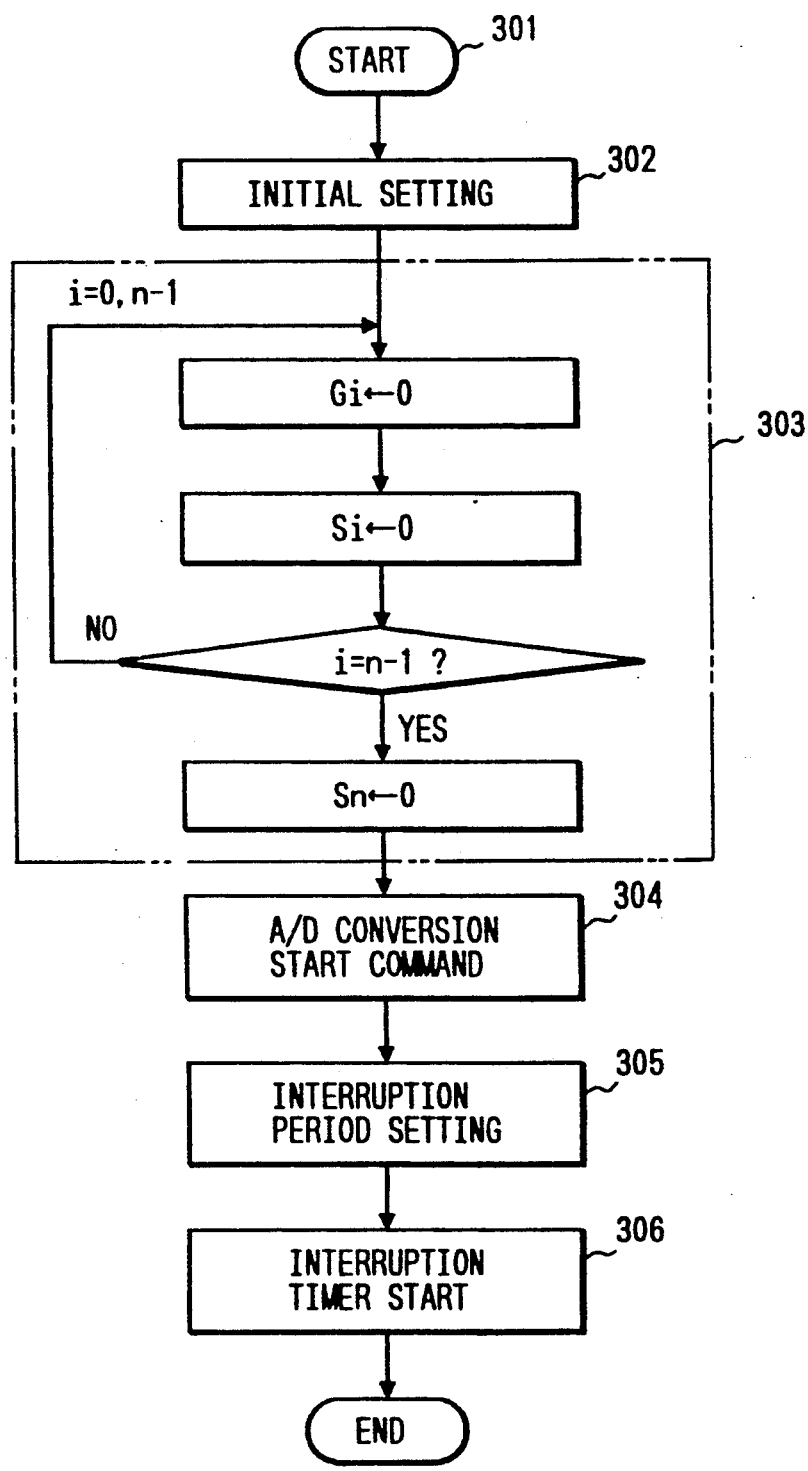

ACTUATION SYSTEM FOR VEHICLE PASSENGER PROTECTIVE DEVICE

BACKGROUND OF THE INVENTION

The present invention relates to an actuation system for a vehicle passenger protective device which detects a collision state of a motor vehicle to actuate a passenger protective device (safety device) such as an airbag in accordance with the detection result.

A conventional actuation system is known and disclosed as "Airbag Actuation Control System" in the Japanese Patent Publication No. 59-8574 wherein an acceleration sensor is provided to detect an acceleration of a motor vehicle at the time of collision of the motor vehicle to generate a signal indicative of the vehicle acceleration. The acceleration signal is integrated for a predetermined integration period so that an airbag is actuated when the integration value exceeds an actuation predictable level. In addition, in the system the integration period is automatically lengthened when the integration value exceeds the actuation predictable level within the integration period, thereby accurately catching the generation of the acceleration signal in relation to the collision to improve the collision decision accuracy.

There is a problem which arises with such a system, in that, since the integration period is lengthened when the acceleration signal exceeds an actuation predictable level irrespective of the timing of the generation of the acceleration signal for the integration period, then if the integration value of the acceleration signal generated when the motor vehicle is running on an irregular road (for example) exceeds the actuation predictable level, the integration period is further lengthened to thereby obtain excess information from the integration result, whereby it is impossible to accurately decide the collision of the motor vehicle.

In addition, there is the possibility that the acceleration signal includes a drift component due to causes, such as, the passage of time and the variation of the temperature. Hence, if the acceleration signal from the acceleration sensor is directly integrated, it becomes difficult to accurately decide the collision of the motor vehicle.

SUMMARY OF THE INVENTION

It is therefore an object of the present invention to provide an actuation system for a vehicle passenger protective device which is capable of improving the collision decision accuracy irrespective of whether the vehicle is running on an irregular road surface or whether there is a drift component in the acceleration signal from the acceleration sensor.

In accordance with the present invention, there is provided an actuation system of a passenger protective device for a motor vehicle, comprising: acceleration detecting means for detecting an acceleration of the motor vehicle to generate an electric acceleration signal indicative of the detected motor vehicle acceleration; integration means for integrating the acceleration signal at every predetermined integration period; decision means for deciding a collision state of the motor vehicle on the basis of an integration value obtained by the integration means; and actuation means for actuating the passenger protective device in response to the decision of the collision state made by the decision means, wherein the integration means includes acceleration signal storing means for successively storing the acceleration signal at each of a plurality of division periods obtained by dividing the predetermined integration period to store and update a plurality of latest acceleration signals and summing means for summing the plurality of latest acceleration signals stored in the acceleration signal storing means in response to the storing and updating due to the acceleration signal storing means so as to obtain the integration value at the predetermined integration period.

Further, in accordance with this invention, there is provided an actuation system of a passenger protective device for a motor vehicle, comprising: acceleration detecting means for detecting an acceleration of the motor vehicle to generate an electric acceleration signal indicative of the detected motor vehicle acceleration; integration means for integrating the acceleration signal at every predetermined integration period; decision means for deciding a collision state of the motor vehicle on the basis of an integration value obtained by the integration means; and actuation means for actuating the passenger protective device in response to the decision of the collision state made by the decision means, wherein the integration means includes acceleration signal storing means for successively storing the acceleration signal at each of a plurality of division periods obtained by dividing the predetermined integration period to store and update a plurality of latest acceleration signals at the integration period, first summing means for summing a first group of the acceleration signals stored in the acceleration signal storing means in response to the storing and updating by the acceleration signal storing means to obtain an integration value at a first integration period and second summing means for summing a second group of the acceleration signals, which are different in number from the first group of the acceleration signals, stored in the acceleration signal storing means in response to the storing and updating by the acceleration signal storing means to obtain an integration value at a second integration period, and the decision means includes first means for deciding a first motor vehicle collision state on the basis of the integration value obtained by the first addition means and second means for deciding a second motor vehicle collision state on the basis of the integration value obtained by the second addition means, and the actuation means actuates the passenger protective device when at least one of the first and second means of the decision means decides the corresponding motor vehicle collision state.

Still further, according to this invention there is provided an actuation system of a passenger protective device for a motor vehicle, comprising: acceleration detecting means for successively detecting accelerations of the motor vehicle to generate electric acceleration signals indicative of the detected motor vehicle accelerations; integration means for respectively integrating the acceleration signals at predetermined different integration periods to obtain integration values; decision means for deciding different collision states of the motor vehicle on the basis of the integration values obtained by the integration means; and actuation means for actuating the passenger protective device in response to the decision of each of the different collision states made by said decision means.

In addition, this invention provides an actuation system of a passenger protective device for a motor vehicle, comprising: acceleration detecting means for detecting an acceleration of the motor vehicle to generate an electric acceleration signal indicative of the detected acceleration; integration means for integrating the acceleration signal at every predetermined measurement period; integration value storing means for storing an integration value of the acceleration value at a previous measurement period which is obtained by the integration means; integration value difference calculating means for calculating a difference between an integration value for a current measurement period which is obtained by the integration means and the integration value at the previous measurement period which is stored in the integration value storing means; determining means for determining whether the integration value difference calculated by the integration value difference calculating means exceeds a predetermined value so as to decide a collision state of the motor vehicle; and actuation means for actuating the passenger protective device when the decision means decide the collision state of the motor vehicle.

Preferably, the integration means includes acceleration signal storing means for successively storing the acceleration signal from the acceleration detecting means at each of a plurality of division periods obtained by dividing the measurement period to store and update a plurality of latest acceleration signals for the measurement period and summing means for summing the plurality of latest acceleration signals stored in the acceleration signal storing means in response to the storing and updating by the acceleration signal storing means to obtain the integration value at the measurement period, and the integration value storing means updates and stores the integration values obtained by the summing means to store a plurality of latest integration values, and the integration value difference calculating means calculates a difference between the integration value obtained by the addition means and the integration value at the previous measurement period which is one of the plurality of integration values stored in the integration value storing means.

BRIEF DESCRIPTION OF THE DRAWINGS

The object and features of the present invention will become more readily apparent from the following detailed description of the preferred embodiments taken in conjunction with the accompanying drawings in which:

FIGS. 11 and 12 are flow charts for describing an operation be executed in a fifth embodiment of this invention;

DETAILED DESCRIPTION OF THE INVENTION

Figure 1:
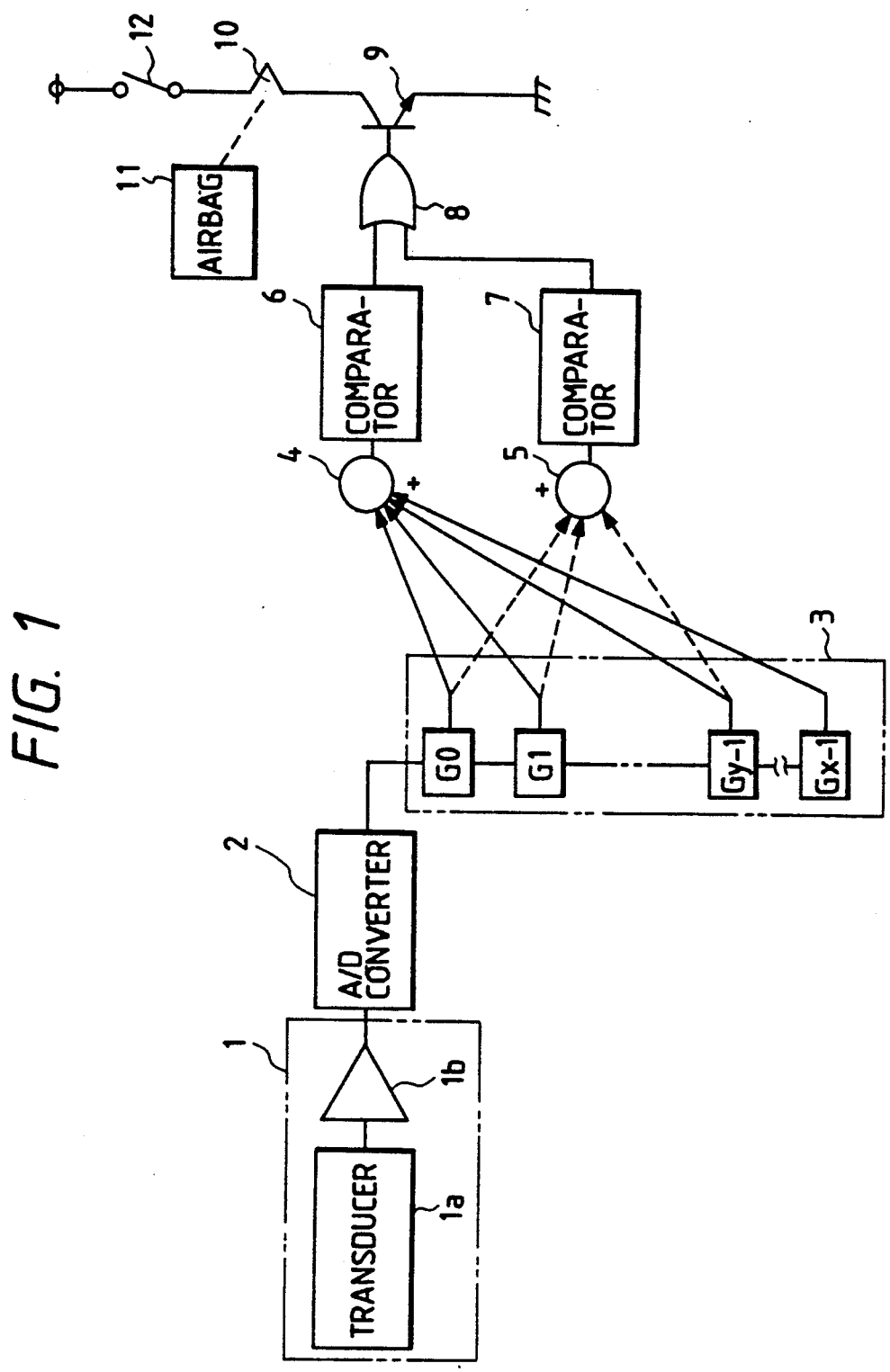
FIG. 1 is a block diagram showing an arrangement of an actuation system for a passenger protective device according to a first embodiment of the present invention.

A first embodiment of the present invention will be described hereinbelow with reference to FIG. 1. In FIG. 1, designated at numeral 1 is an acceleration sensor for detecting the acceleration of a motor vehicle which comprises a transducer $1a$ for generating a signal corresponding to the acceleration and an amplifier $1b$ for amplifying and outputting the acceleration signal from the transducer $1a$. The acceleration signal from the acceleration sensor 1 is A/D-converted in an A/D converter 2 and then inputted to a first-step shift register Go of a storage device 3. Here, prior to the inputting of the data to the first-step shift register Go, the acceleration data previously stored in the shift registers Go to $G_{x-1}$ are successively shifted to the next-step shift registers, whereby the latest x acceleration data are stored in the shift registers Go to $G_{x-1}$. Further, the shifting operation of the data between the shift registers and inputting of the A/D-converted acceleration data to the shift register Go are effected in synchronism with a system clock signal.

The acceleration data stored in these shift registers Go to Gx−1 are summed (addition-processed) in an adder 4 to obtain an integration value of the acceleration data at the x×h period where x represents the number of the shift registers and h designates the period of the system clock signal. In addition, the acceleration data stored in the shift registers Go to Gy−1 are summed in another adder 5 to obtain an integration value of the acceleration data at the y×h period where y denotes the number of the shift registers smaller than x. The reason for obtaining the integration values at the two integration periods are as follows.

Figure 2:
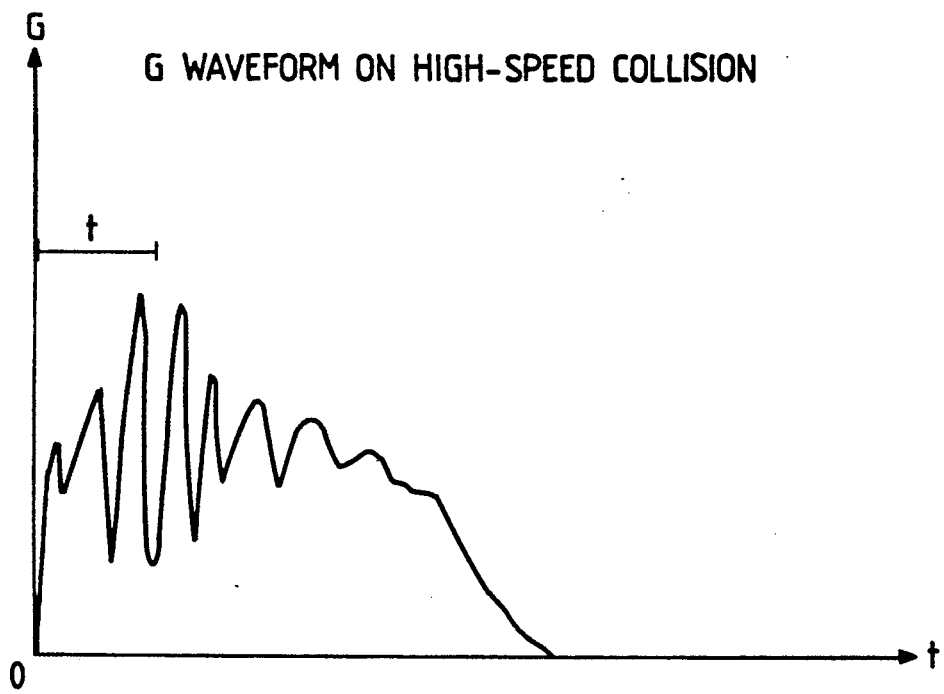
FIGS. 2 and 3 are graphic diagrams showing acceleration waveforms at the time of high-speed and low-speed collisions of a motor vehicle.
Figure 3:
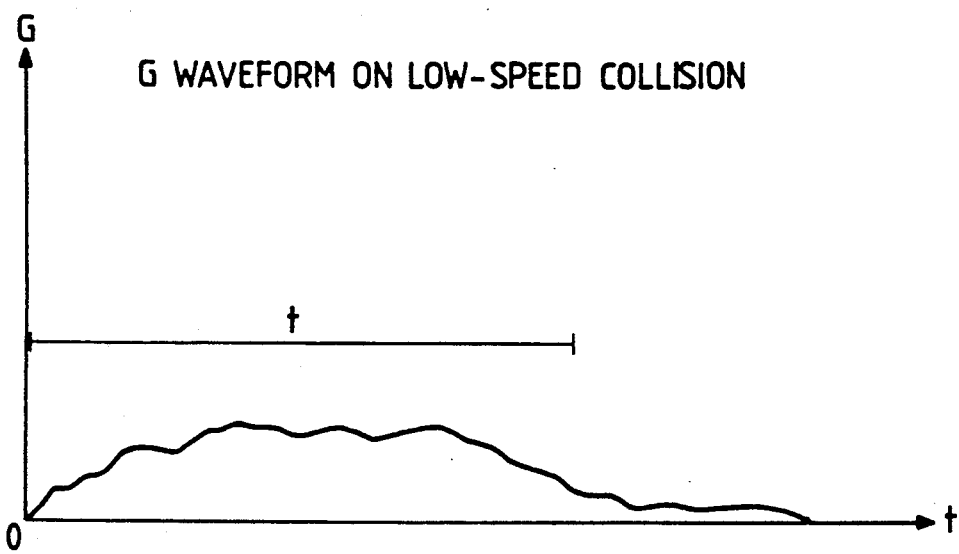

FIGS. 2 and 3 show acceleration (G) waveforms to be generated at the time of collision of a motor vehicle, FIG. 2 indicating a waveform due to the collision occurring when the motor vehicle is running at a high speed (which will be referred hereinafter to as high-speed collision) and FIG. 3 indicating a waveform due to the collision occurring when the motor vehicle is running at a low speed (which will be referred hereinafter to as low-speed collision). Since in the low-speed collision the acceleration level is lower than the acceleration level in the high-speed collision, the integration value at a relatively long period is required for accurately performing the collision decision. On the other hand, since in the high-speed collision the G waveform appears as illustrated in FIG. 2, if the integration period is the same as the period for the low-speed collision, the collision decision is required to be made with a lower decision level as compared with the case of the low-speed collision for ensuring a high responsibility of the collision decision. However, the lowering of the decision level causes a decision error. Thus, the integration period is shortened and the decision level is lowered, thereby improving the responsibility of the decision.

Returning again to FIG. 1, the data (integration data) summed in the adder 4 is supplied to a comparator 6 to be compared with a first decision level for the low-speed collision, and the integration data summed in the adder 5 is supplied to a comparator 7 to be compared with a second decision level for the high-speed collision. When in at least one of the comparators 6 and 7 the integration data exceeds the corresponding decision level, the comparator outputs an ignition signal through an OR circuit 8 to an ignition transistor 9. In response to the ignition signal, the ignition transistor 9 turns on so that a drive current is supplied to a squib 10 to inflate or deploy an airbag 11. Here, for the operation safety a mechanical switch (for example, a mercury switch) 12 arranged to be operable at a low acceleration is provided in the power supply path to the squib 10. Because of being arranged to be operable at a low acceleration, this mechanical switch 12 operates to take the closing state before the output of the ignition signal from the comparator 6 or 7.

According to the above-described embodiment, the integration period is divided into a plurality of periods and a plurality of latest acceleration signals at the division periods are updated and stored to be summed so as to successively obtain the integration values at the integration period. Accordingly, it is possible to accurately detect the generation of the acceleration signal due to the collision of the motor vehicle to improve the collision decision accuracy without lengthening the integration period. In addition, even if an acceleration signal is temporarily generated when the motor vehicle is running on an irregular road surface, since the integration period is successively shifted in units of the division period, it is possible to eliminate the influence of the temporary generation of such an acceleration signal with time. Thus, unlike the Japanese Patent Publication No. 59-8574 where the integration period is lengthened due to the temporary generation of the acceleration signal, it is possible to improve the collision decision accuracy at the integration period without changing the integration evaluation.

Figure 4:
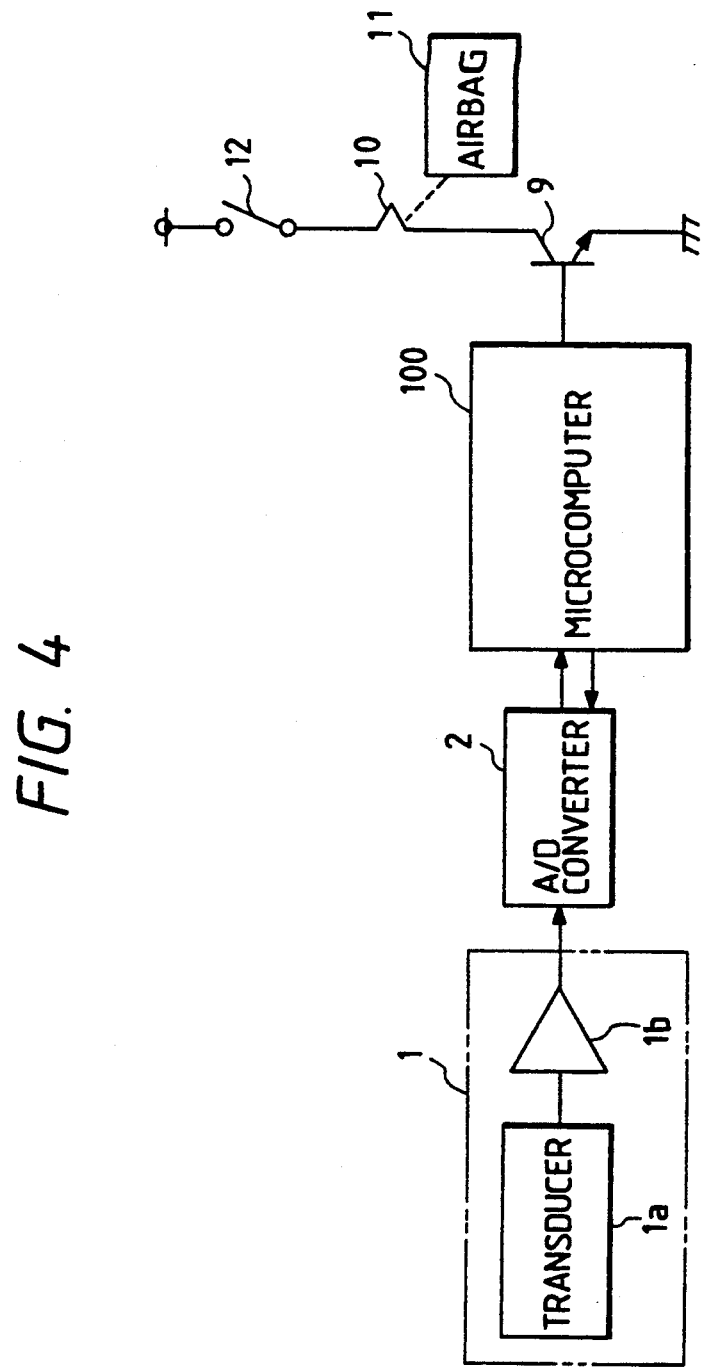
FIG. 4 is a block diagram showing an arrangement of an actuation system according to a second embodiment of this invention.
Figure 5:
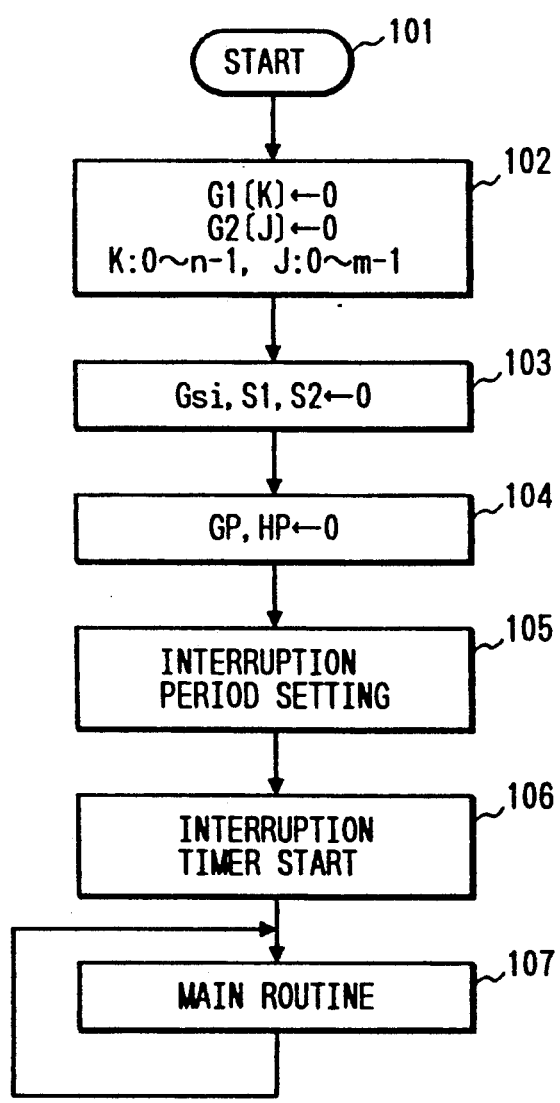
FIGS. 5 and 6 are flow charts for describing an operation to be executed in the second embodiment of this invention.

Secondly, a description will be made hereinbelow in terms of a second embodiment of this invention where a microcomputer 100 is provided in place of the storage device 3, adders 4, 5, comparators 6, 7 and OR circuit 8 in FIG. 1. FIG. 4 shows an arrangement of the second embodiment, wherein parts corresponding to those in FIG. 1 are marked with the same numerals and characters and the description thereof will be omitted for brevity. An operation of the microcomputer 100 will be described hereinbelow with reference to FIGS. 5 and 6. In response to the turning-on of a key switch of the motor vehicle, a power from a vehicle battery (not shown) is applied to the respective circuits and the microcomputer 100 starts the calculation operation with a step 101 in FIG. 5. The operation subsequently advances to a step 102 to clear all the contents of data areas G1[K] and G2[J] in a memory to "0" and further proceeds to a step 103 to clear the contents of data areas Gsi, S1 and S2 in the memory to "0". Thereafter, a step 104 follows to set pointers GP and HP to "0". Here, the data area G1[K] stores the acceleration data for obtaining the integration data for the high-speed collision and the data area G2[J] stores the acceleration data for obtaining the integration data for the low-speed collision. The pointer GP is for indicating one specific data region of the data area G1[K] and the pointer HP is for indicating one specific data region of the data area G2[J]. Further, the data area S1 stores the integration data for the high-speed collision and the data area S2 stores the integration data for the low-speed collision.

Figure 6:
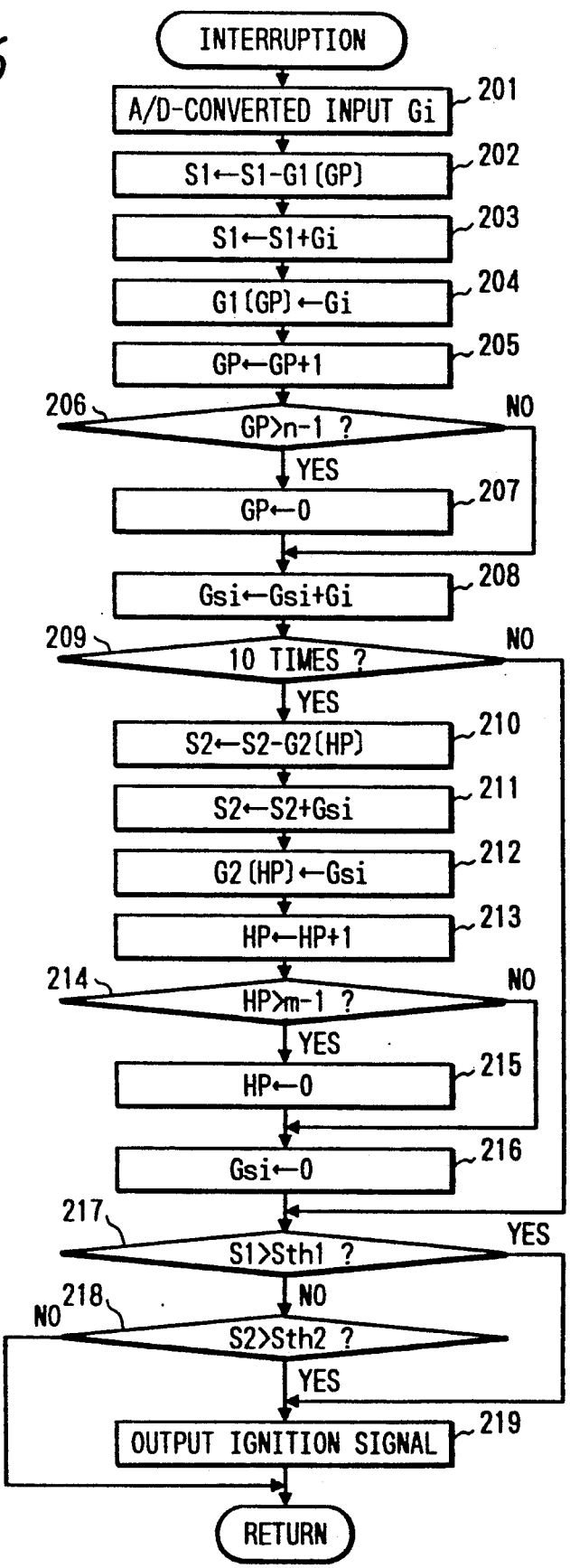

In a step 105 an interruption period of an interruption timer encased in the microcomputer 100 is set to the above-mentioned h. The interruption timer starts in the next step 106. Thus, in the microcomputer 100 the interruption timer operates to thereby periodically execute an interruption routine as illustrated in FIG. 6. A step 107 is for the main routine which includes processes such as trouble inspection of the airbag device.

In response to an occurrence of an interruption by the interruption timer, the microcomputer 100 starts the interruption calculation operation shown in FIG. 6. First, in a step 201 the acceleration data Gi A/D-converted by the A/D converter 2 is inputted and in steps 202 and 203 the integration data S1 is updated. That is, these steps are for eliminating the earliest (oldest) stored acceleration data in the data area G1[GP] and adding the latest acceleration data inputted in the previous step 201 so as to replace the earliest data with the latest data, thereby obtaining the integration data S1 at the newest integration period shifted by the above-mentioned division period. For performing the aforementioned updating process in the next interruption, in a step 204 the acceleration data Gi inputted in the step 201 is stored in the G1[GP] area and in a step 205 the pointer GP is incremented by 1. Subsequent steps 206 and 207 are for returning the pointer GP to 0 when exceeding n−1. That is, because the data area G1[K] is 0 to n−1, the pointer Gp is required to take a value therebetween. Accordingly, when GP becomes n, a process for returning GP to 0 is required.

Furthermore, steps 208 to 216 are for updating and storing the acceleration data and the integration data for the low-speed collision. Since, as described above, the integration period for the low-speed collision is required to be longer than that of the high-speed collision, it is required to store more acceleration data in the meantime. However, if the acceleration data is stored in the memory at every input, the number of the memories becomes great. Thus, in the step 208 the acceleration data is successively and temporarily stored and summed as the temporarily stored data Gsi. When the number of the temporarily stored acceleration data reaches ten, that is, when the number of the interruptions reaches ten (step 209), the temporarily stored data Gsi is used for updating the acceleration data G2[HP] and the integration data S2 (steps 210 to 212). The steps 210 to 215 correspond to the previous steps 202 to 207. Here, the number of the G2[HP] data areas is taken as m, and since the above operation is effected at every ten interruptions, the integration period for the low-speed collision becomes 10×m×h. In the step 206, the temporarily stored data Gsi is reset to 0 for temporarily storing the next ten acceleration data.

Subsequent steps 217 and 218 are for checking whether the integration data S1 and S2 respectively exceed decision levels Sth1 and Sth2. If the decisions of both the steps 217 and 218 are affirmative, the operation advances to a step 219 to generate an ignition signal to the ignition transistor 9 whereby a drive current passes through the squib 10 to inflate the airbag 10.

Figure 7:
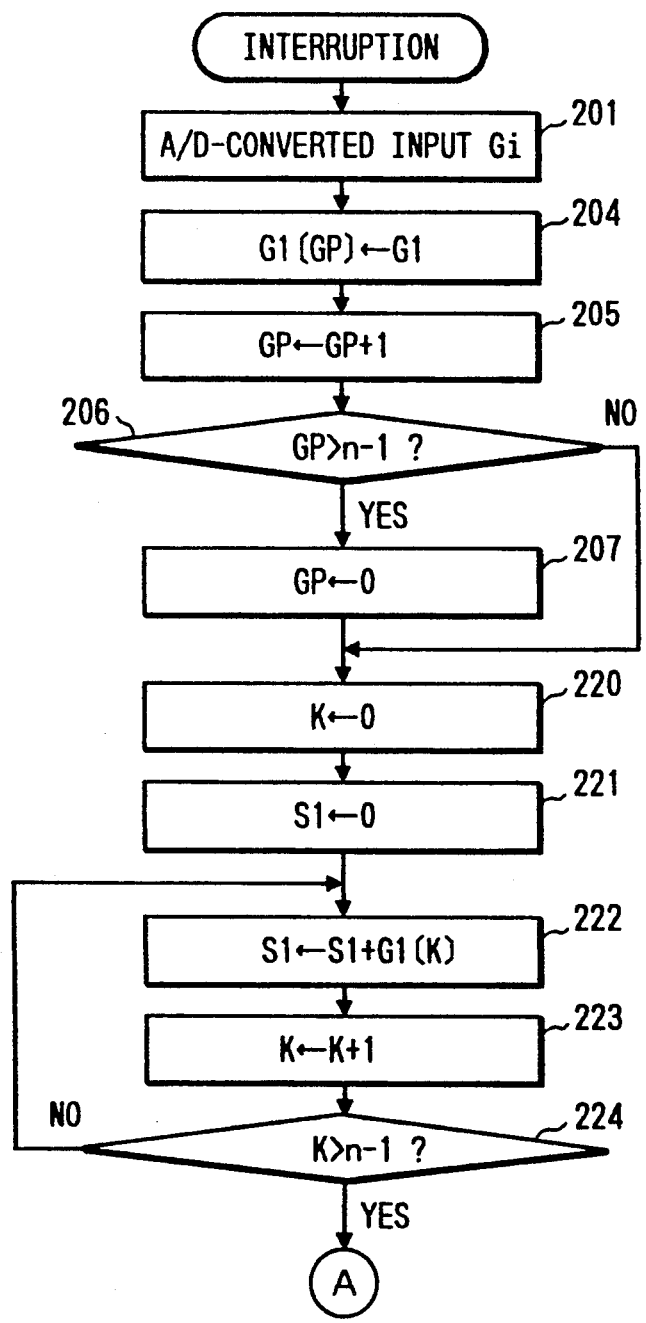
FIGS. 7 and 8 are flow charts for describing an operation to be effected in a third embodiment of this invention.
Figure 8:
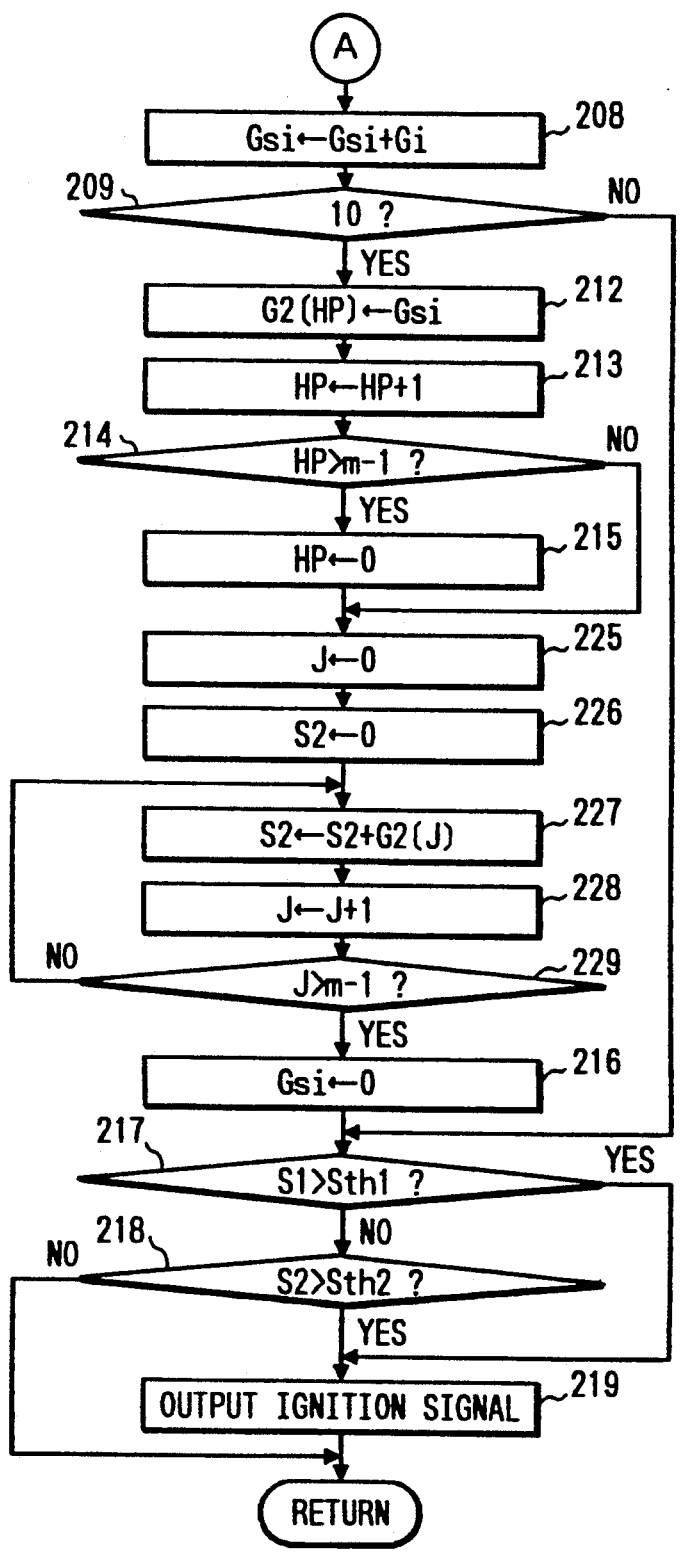

Although in the above-described second embodiment the earliest stored acceleration data are removed and the latest acceleration data is added so as to update the integration data S1 and S2 as indicated in the steps 202 and 203, it is appropriate to take the sum of all the acceleration data stored. This case will be described hereinbelow as a third embodiment of this invention with reference to FIGS. 7 and 8 where steps corresponding to those in FIG. 6 are marked with the same numerals. In FIGS. 7 and 8, in a step 204 the latest acceleration data is stored, for updating, in the G1[GP] area where the earliest acceleration data has been stored and in a step 205 the pointer GP is incremented as well as in the second embodiment, and therefore the latest n acceleration data are stored in the G1[K] area. The stored acceleration data is addition-processed in steps 220 to 224 so as to calculate the integration data S1 for the high-speed collision. Similarly, the integration data S2 for the low-speed collision can be obtained in steps 225 to 229. The collision decision is made on the basis of the integration data S1 and S2 as well as in the above-described second embodiment.

According to the above-described embodiments, it is possible to obtain the integration value at the integration period successively shifted at every division period, thereby accurately detecting the generation of the acceleration signal due to the collision of the motor vehicle to improve the collision decision accuracy without lengthening the integration period. In addition, even if an acceleration signal is temporarily generated when the motor vehicle is running on an irregular road surface, since the integration is successively shifted in units of the division period, it is possible to eliminate such a temporarily generated acceleration signal with time, thereby preventing the deterioration of the integration evaluation due to the temporarily generated acceleration signal. Moreover, according to the second embodiment, since the integration values at the first and second different integration periods can be obtained so as to respectively perform the collision decisions on the basis of the integration values, it is possible to perform the different types of collision decisions.

Figure 9:
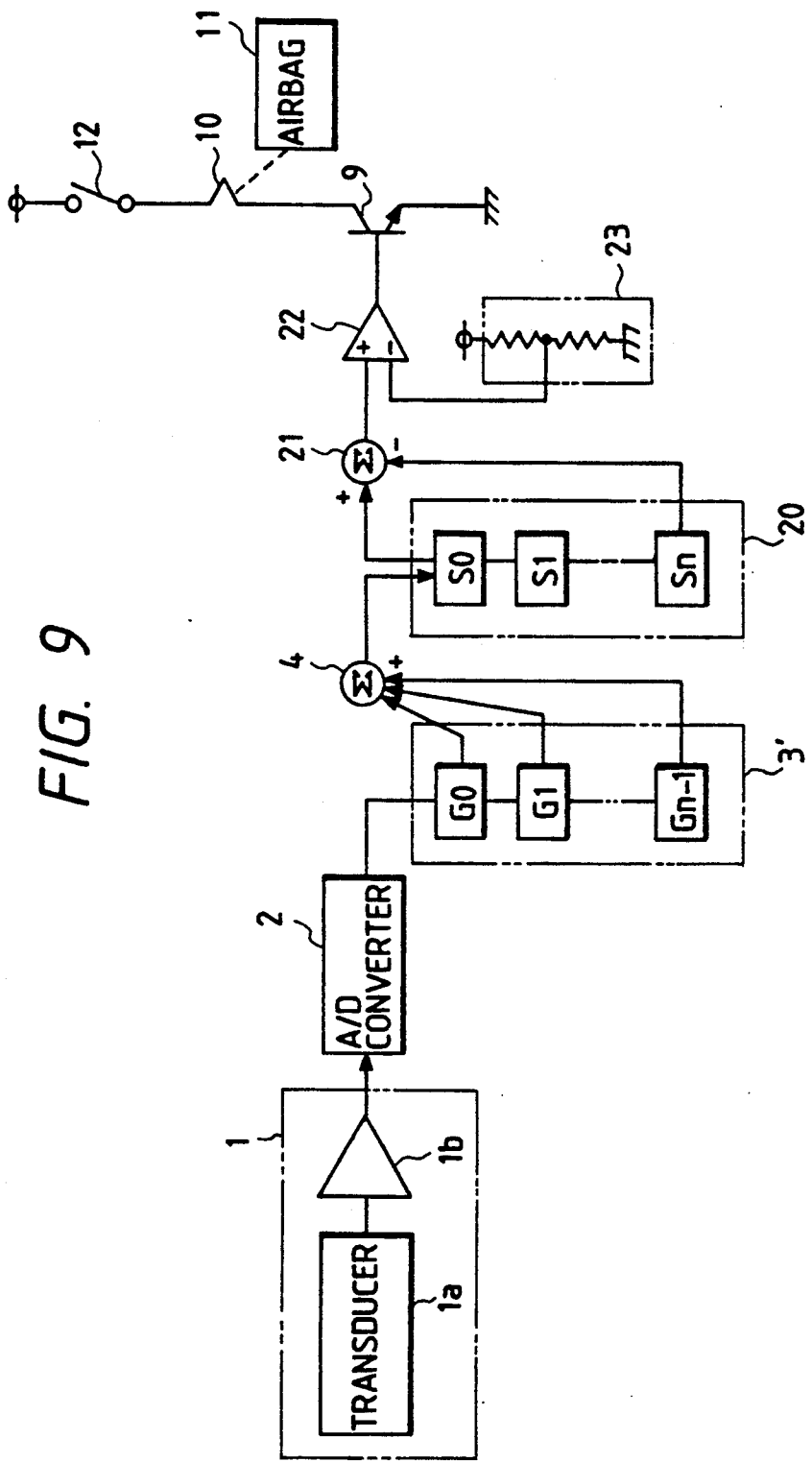
FIG. 9 is a block diagram showing an arrangement of an actuation system according to a fourth embodiment of this invention.
Figure 10:
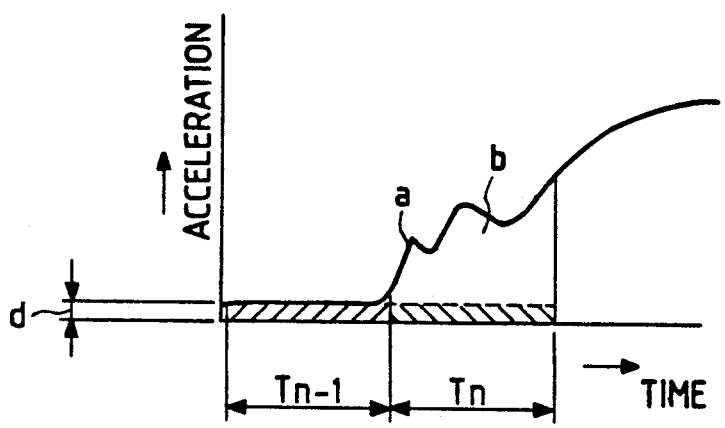
FIG. 10 is a graphic diagram showing acceleration data including a drift component.

Furthermore, a description will be made hereinbelow with reference to FIG. 9 in terms of a fourth embodiment of this invention, where parts corresponding to those in FIG. 1 are marked with the same numerals and the detailed description will be omitted for simplification. In FIG. 9, an acceleration signal from an acceleration sensor 1 is A/D-converted by an A/D converter 2 and then inputted to a first-step shift register Go of a first memory 3'. As in the above-described first embodiment, prior to the inputting of the data to the first-step shift register Go, the acceleration data previously stored in the shift registers Go to $G_{n-1}$ are successively shifted to the next-step shift registers, whereby the latest n acceleration data is stored in the shift registers Go to $G_{n-1}$, and the shifting operation of the data between the shift registers and inputting of the A/D-converted acceleration data to the shift register Go are effected in synchronism with a system clock signal. The acceleration data stored in the shift registers Go to $G_{n-1}$ are summed in an adder 4, the summed data representing an integration value of the acceleration data at a period T taken by the product of the number n of the shift registers and the period h of the system clock signal. Further, the integration data from the adder 4 is inputted to a first-step shift register So of a second memory 20. Similarly, prior to the inputting of the data to the first-step shift register So, the acceleration data previously stored in the shift registers So to Sn of the second memory 20 are successively shifted to the next-step shift registers in synchronism with the system clock signal. Here, the shift registers S1 to Sn respectively have the integration data at the period T successively traced back in units of the system clock period. That is, in the shift register Sn the integration data before the period corresponding to the n system clocks, i.e., before the period of $n \times h = T$, are stored. Thus, by taking the difference between the integration data stored in the shift register So and the shift register Sn, it is possible to detect the variation of the integration data at the two successive periods T. This is further described with reference to FIG. 10. In FIG. 10, in the case that the acceleration data varies as indicated by character a, assuming that a drift component d is included in the acceleration data a, the integration data (the integration data stored in the shift register Sn) due to the drift component d is obtained at the previous period Tn−1. On the other hand, the integration data (the integration data stored in the shift register So) due to the true acceleration data and the drift component d is obtained at the period Tn. Thus, with the difference between both the integration data being taken, it is possible to obtain the integration data caused by the true acceleration data without including the drift component d.

Returning again to FIG. 9, the integration data stored in the shift register So and the integration data stored in the shift register Sn are supplied to a subtracter 21 to subtract the integration data from the shift register Sn from the integration data from the shift register So and thereby obtain the integration data resulting from the true acceleration data. The integration data outputted from the subtracter 21 is supplied to a comparator 22 so as to be compared with a threshold outputted from a threshold generating circuit 23 to check, in accordance with the comparison result, whether an acceleration corresponding to a collision of the motor vehicle occurs. If the integration data from the comparator 22 exceeds the threshold, the decision is made such that the acceleration corresponding to a collision of the motor vehicle occurred, thereby generating the ignition signal. In response to this ignition signal, the ignition transistor 9 turns on causing the drive current to be supplied to the squib 10 to deploy the airbag 11. Here, in the fourth embodiment, the first memory 3' and the adder 4 constitute an integration means, the second memory 20 constitutes an integration value storing means, the subtracter 21 constitutes an integration value difference calculating means, the comparator 22 and the threshold generating circuit 23 make up a decision means, and the ignition transistor 9 makes up a protective-device starting means. Further, the first memory 3' of the integration means acts as an acceleration signal storing means and the adder 4 acts as an summation (addition) means.

Figure 12:
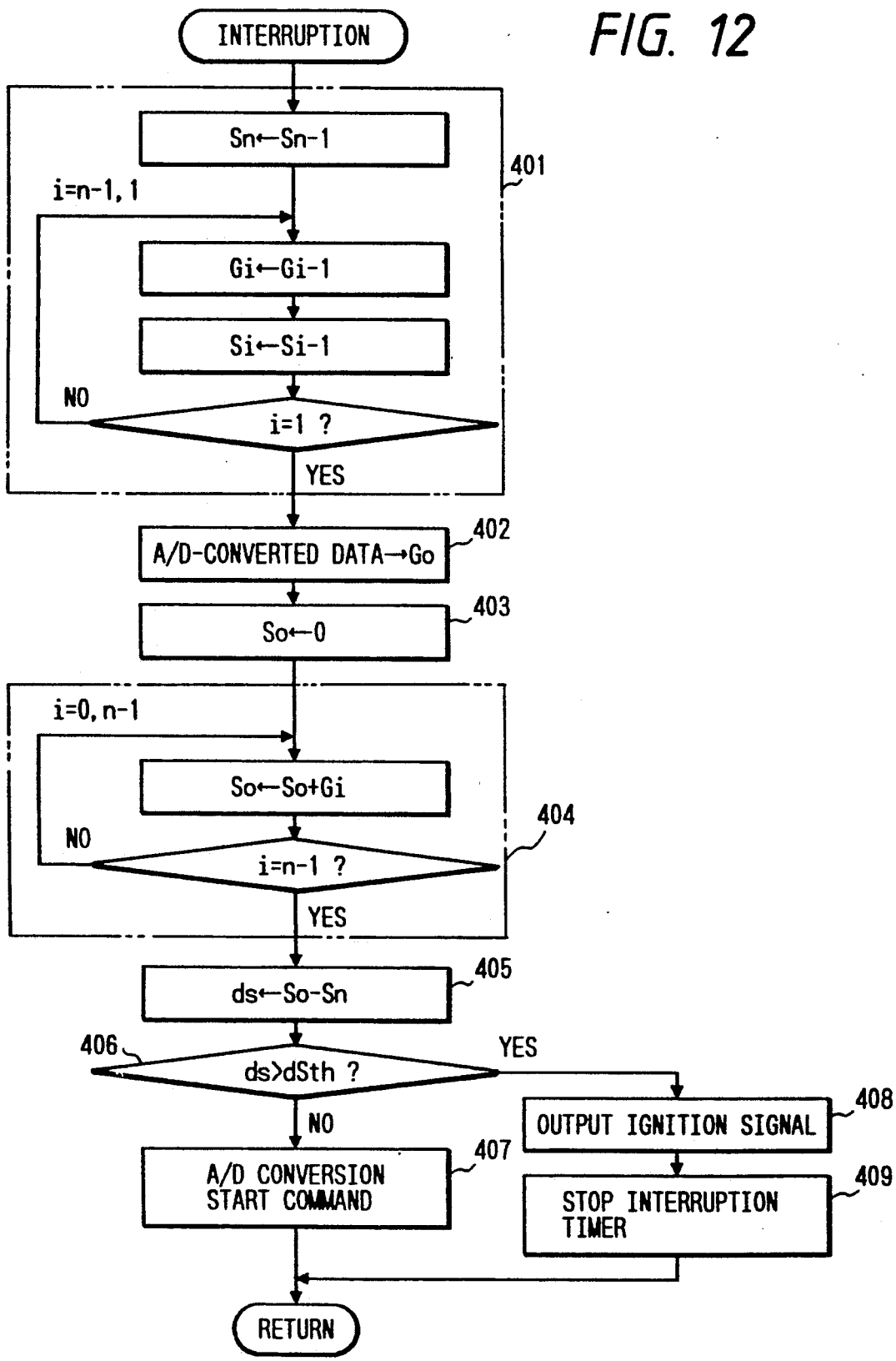

Furthermore, a fifth embodiment of this invention will be described hereinbelow. The basic arrangement of an actuation system of the fifth embodiment is similar to the arrangement illustrated in FIG. 4. One difference between the fourth and fifth embodiments is that a microcomputer 100 is provided in place of the first and second memories 3', 20, adder 4, the subtracter 21, the threshold generating circuit 23 and the comparator 22. FIGS. 11 and 12 shows an operation to be executed in the microcomputer 100. In FIG. 11, this operation starts with a step 301 in response to the turning-on of a key switch of the motor vehicle, then followed by a step 302 for various initial settings. Thereafter, the operation advances to a step 303 to clear all the data in the data areas Go to $G_{n-1}$ and So to Sn of a memory, which respectively correspond to the shift registers Go to $G_{n-1}$ and So to Sn in FIG. 9, and then proceeds to a step 304 to output an A/D conversion start command to the A/D converter 2. Further, a step 305 follows to set the interruption period of the interruption timer of the microcomputer 100 to h, the interruption timer being started in a subsequent step 306. Accordingly, the microcomputer 100 periodically executes an interruption routine of FIG. 12 in response to the operation of the interruption timer. Here, the time required for the A/D conversion of the A/D converter 2 is set to be sufficiently shorter than the timer interruption period h.

In FIG. 12, in response to the occurrence of the interruption due to the interruption timer, the control starts with a step 401 to perform a shifting operation where the data in the data areas $G_{n-2}$ through Go is successively shifted to the data areas $G_{n-1}$ to G1, and the data in the data areas $S_{n-1}$ through Sn is successively shifted to the data areas Sn to S1. Thereafter, the control goes to a step 402 to input the data converted in the A/D converter 2 and store it in the data area Go. This process corresponds to the data input to the shift register Go in FIG. 9.

Subsequently, a step 403 is executed to clear the data area So to 0 and a step 404 is executed to add the data in the data areas Go to $G_{n-1}$ to the data in the data area So for updating. This process corresponds to the summation of the acceleration data in the shift registers Go to $G_{n-1}$ by the adder 4 in FIG. 9. The control then advances to a step 405 to subtract the value of the data area Sn from the value of the data area So to obtain an integration difference data dS, and further proceeds to a step 406 to compare this integration difference data dS with a threshold dSth. Here, the step 405 corresponds to the process effected by the subtracter 21 in FIG. 9 and the step 406 corresponds to the process effected by the comparator 22 in FIG. 9. Thus, the aforementioned integration difference data dS is an integration value of the true acceleration data which is obtained by eliminating the drift component from the acceleration signal of the acceleration sensor 1.

If the answer of the step 406 is "NO", the control advances to a step 407 to output an A/D conversion start command to the A/D converter 2 to again input data for the next interruption operation. On the other hand, when the acceleration corresponding to the collision of the motor vehicle occurs so that the integration difference data dS exceeds the threshold dSth, the answer of the step 406 becomes "YES" whereby the control goes to a step 408 to output an ignition signal to the ignition transistor 9. Further, the control goes to a step 409 to stop the interruption timer for terminating the current interruption repeat calculation. Accordingly, the generation of the ignition signal causes the turning-on of the transistor 9 so that a drive current is supplied to the squib 10 to inflate the airbag 11.

Figure 13:
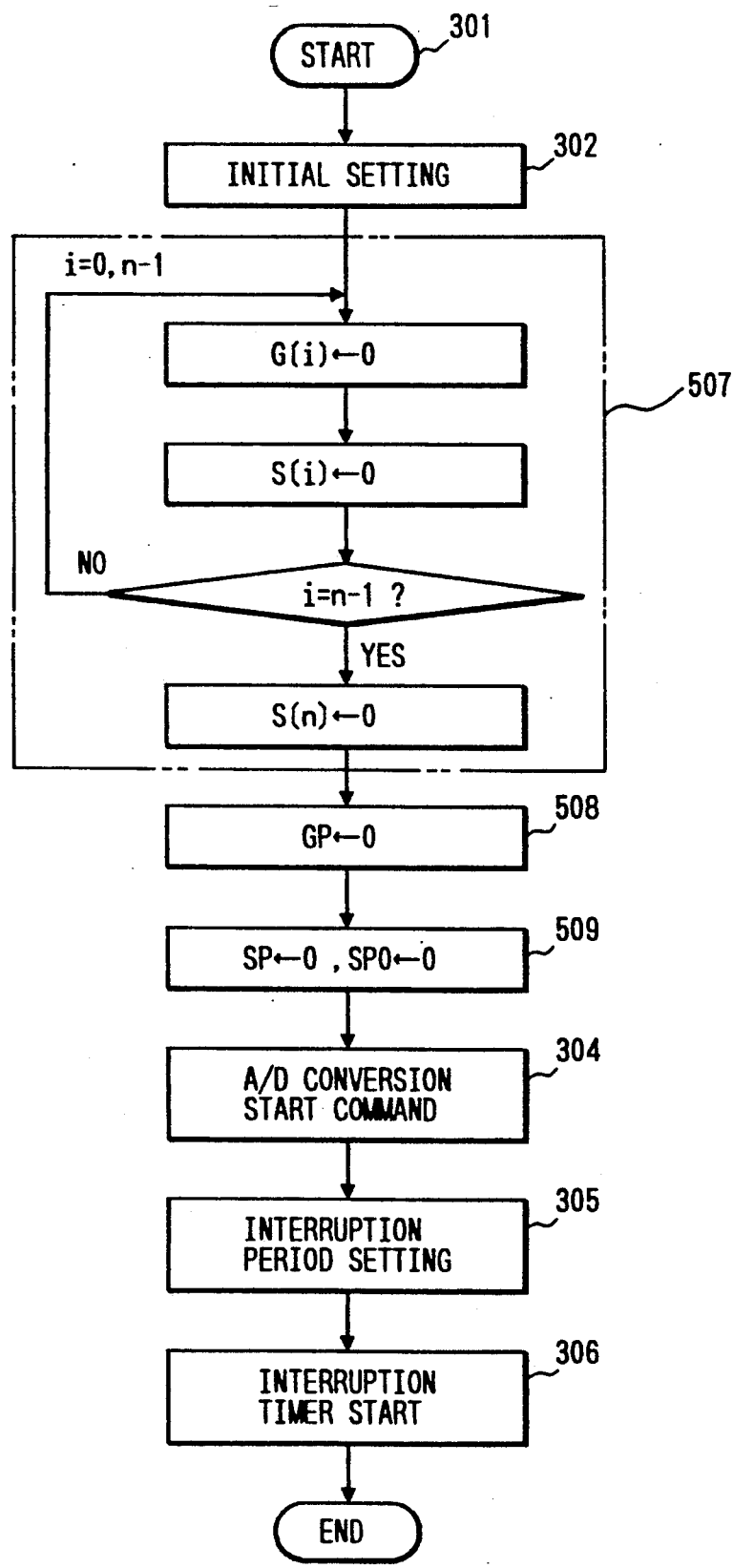
FIGS. 13 and 14 are flow charts for describing an operation to be effected in a sixth embodiment of this invention.

Moreover, a sixth embodiment of this invention will be described hereinbelow with reference to FIGS. 13 and 14. Although the fifth embodiment is arranged such that the stored data in the memory are successively shifted, the sixth embodiment is arranged such that the reading pointer of the memory is shifted without shifting the data. In FIG. 13 where steps corresponding to those in FIG. 11 are marked with the same numerals, the microcomputer 100 starts the operation with a step 301 and executes a step 302 for the initial setting, then followed by a step 507 to clear all the data in the data areas G[0] to G[n−1] and the data areas S[0] to S[n] to 0. Here, G[0] to G[n−1] and S[0] to S[n] respectively represent the contents of the data in G and S areas shown in FIG. 15 and respectively correspond to the data of the data areas Go to Gn−1 and So to Sn in the above-described fifth embodiment. Thereafter, the operation goes to a step 508 to set a pointer GP to 0 and further advances to a step 509 to set pointers SP and SPO to 0. The following steps 304 to 306 are the same as those in FIG. 11.

Figure 15:
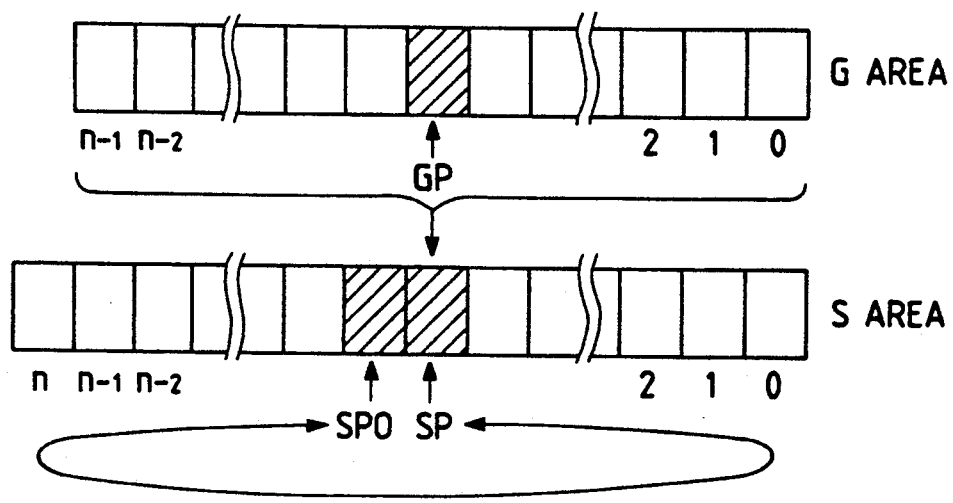
FIG. 15 is an illustration for describing memory areas in the sixth embodiment.
Figure 14:
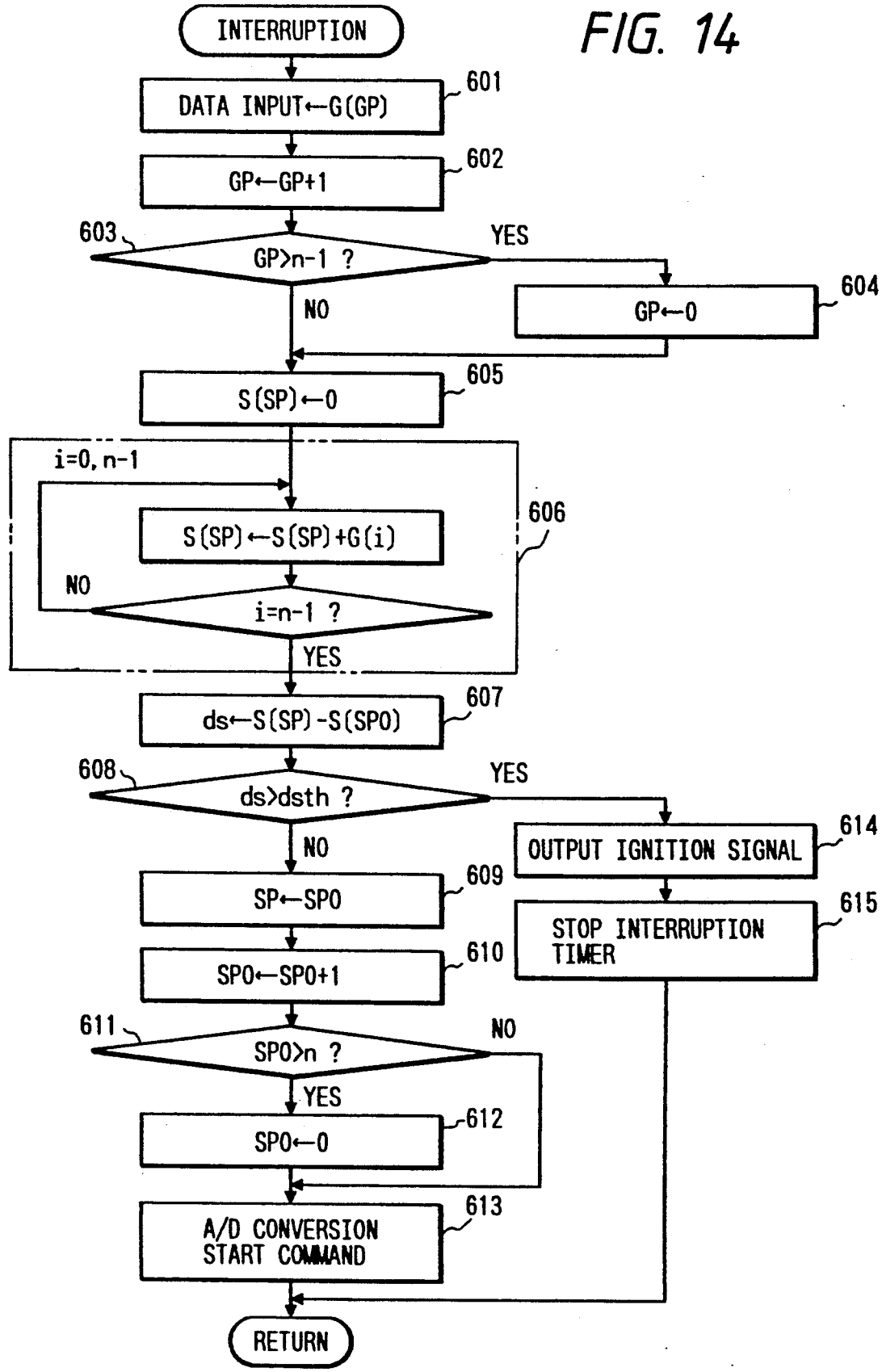

In response to the interruption due to the interruption timer, the microcomputer 100 executes the interruption calculation operation illustrated in FIG. 14. In FIG. 14, the operation starts with a step 601 to input the acceleration data from the A/D converter 2 and store it in the data area G[GP] designated by the pointer GP (see FIG. 15). This pointer GP is incremented by one in a step 602. Further, in a step 603 it is checked whether the pointer GP is greater than n−1. This decision is for returning the pointer GP to 0 when GP reaches n, because the number of the data areas in the G area is n as shown in FIG. 15. Thus, if the answer of the step 603 is "YES", a step 604 follows to set the pointer GP to 0. That is, with this process being repeatedly effected at every timer interruption, the pointer GP is successively changed between 0 to n−1, and the latest acceleration data is inputted to the pointer GP so that the acceleration data corresponding to n−1 is stored in GP-1.

Further, the operation advances to a step 605 to set the data area S[SP] to be designated by the pointer SP to 0, then is followed by an addition step 606 to add the acceleration data in the data areas G[0] to G[n−1] with respect to the data area S[SP], thereby performing the updating. As a result, the integration data at the current period Tn is stored in the data area S[SP]. Here, with the hereinafter-described updating of the pointer SP, the integration data at the previous period Tn−1 is stored in the data area S[SPO]. Thus, in the next step 607 the value of the data area S[SPO] is subtracted from the value of the data area S[SP] whereby it is possible to obtain the integration difference data dS as well as in the step 405 in FIG. 12. This integration difference data dS is compared with a threshold dSth in a step 608. If the decision of the step 608 is "NO", a step 609 follows to set the pointer SPO to SP and a step 610 further follows to increment the pointer SPO by one. Accordingly, as shown in FIG. 15, in the S area the pointers SP and SPO are successively shifted to the greater-number side. That is, in the S area the previous data before the division periods taken in accordance with the system clock signal are successively stored along the direction indicated by an arrow in FIG. 15 from the pointer SP. Due to such a circulating storage of the integration data, in steps 611 and 612 the pointer SPO is set to 0 when the pointer SPO exceeds n. Steps 613 to 615 respectively correspond to the steps 407 to 409 in FIG. 12.

According to the sixth embodiment, the data shifting is not performed but the updating of the pointers GP, SP and SPO is effected to thereby obtain the effect similar to the effect of the above-described fifth embodiment.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiments the airbag is used as the passenger protective device, it is also appropriate to use a seat belt as the passenger protective device. Further, although in the above-described embodiments the acceleration data and the integration data at the division period taken in accordance with the system clock are stored to obtain the integration difference data at each division period, it is appropriate to obtain the integration value in units of the measurement period as well as the above-mentioned prior art (Japanese Patent Publication No. 59-8574) to obtain the difference between the integration values at the previous and current measurement periods.

What is claimed is:

1. An actuation system of a passenger protective device for a motor vehicle, comprising:
    means for detecting accelerations of said motor vehicle and generating successive acceleration signals indicative of said detected accelerations;
    means for integrating said acceleration signals over successive predetermined periods and creating an integration value for each of said predetermined periods, said integration means comprising:
        acceleration signal storing means for successively storing said acceleration signals at each of a plurality of integration division times within each of said predetermined periods; and
        means for summing said plurality of acceleration signals stored at said plurality of division times within each of said predetermined periods to establish said integration value for each of said predetermined periods;
    means for deciding a collision state of said motor vehicle on the basis of said integration value for each of said predetermined periods; and
    means for actuating said passenger protective device in response to said collision state.

2. An actuation system of a passenger protective device for a motor vehicle, comprising:
    means for detecting acceleration of said motor vehicle and generating an electric acceleration signal indicative of the detected motor vehicle acceleration;
    means for storing samples of said acceleration signal at a plurality of most current time intervals;
    first means for successively integrating said acceleration signal over a first predetermined integration period, said first integrating means including first means for summing a first set of most current samples of said acceleration signal stored during said first predetermined integration period and obtaining a first integration value;
    second means for successively integrating said acceleration signal over a second predetermined integration period, said second integrating means including second means for summing a second set of most current samples of said acceleration signal stored during said second predetermined integration period and obtaining a second integration value, said first predetermined integration period being longer than said second predetermined integration period;
    means for determining whether said motor vehicle is in a collision state based on said first integration value and said second integration value; and
    means for actuating said passenger protective device when said determining means determines that said motor vehicle is in said collision state.

3. An actuation system of a passenger protective device for a motor vehicle, comprising:
    a single acceleration detection device for detecting accelerations of said motor vehicle and generating an acceleration signal indicative of the detected motor vehicle accelerations;
    first means for successively integrating samples of said acceleration signal over a first predetermined integration period and obtaining a first integration value;
    means for deciding whether said motor vehicle is in a collision state based on comparing said first integration value with a first threshold value; and
    means for actuating said passenger protective device in response to said deciding means.

4. The actuation system of claim 3, further comprising second means for successively integrating samples of said acceleration signal over a second predetermined integration period and obtaining a second integration value, said first predetermined integration period being longer than said second predetermined integration period; and said deciding means further comprising means for deciding whether said motor vehicle is in a collision state based on comparing said second integration value with a second threshold value.

5. An actuation system of a passenger protective device for a motor vehicle, comprising:
    a single acceleration detecting device for detecting an acceleration of said motor vehicle and generating an acceleration signal indicative of said detected acceleration;
    means for integrating said acceleration signal over successive predetermined periods and producing successive integration values;
    means for storing a present integration value and a previous integration value, said storing means being updated each successive predetermined period;
    means for calculating a difference between said present integration value and said previous integration value for each successive predetermined period;
    means for determining whether said integration difference exceeds a predetermined value so as to determine a collision state of said motor vehicle; and
    means for actuating said passenger protective device based on said collision state of said motor vehicle.

6. The actuation system of claim 5, wherein said integration means comprises:
    means for successively storing samples of said acceleration signal at a plurality of time intervals, said acceleration signal samples being updated each successive predetermined period; and
    means for summing said samples stored during each of said predetermined periods to produce said successive integration values.

* * * * *